(12) United States Patent
Harden

(10) Patent No.: US 10,110,786 B2
(45) Date of Patent: Oct. 23, 2018

(54) ACCESSORY MOUNT

(71) Applicant: BBY SOLUTIONS, INC., Richfield, MN (US)

(72) Inventor: Kenneth Harden, Eden Prairie, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 47 days.

(21) Appl. No.: 15/207,970

(22) Filed: Jul. 12, 2016

(65) Prior Publication Data

US 2018/0020130 A1 Jan. 18, 2018

(51) Int. Cl.
| | |
|---|---|
| *H04N 5/225* | (2006.01) |
| *F16G 11/14* | (2006.01) |
| *G03B 17/56* | (2006.01) |
| *F16B 2/08* | (2006.01) |
| *F16M 13/02* | (2006.01) |
| *F16B 2/10* | (2006.01) |

(52) U.S. Cl.
CPC ............. *H04N 5/2251* (2013.01); *F16B 2/08* (2013.01); *F16B 2/10* (2013.01); *F16G 11/14* (2013.01); *F16M 13/022* (2013.01); *G03B 17/561* (2013.01)

(58) Field of Classification Search
CPC .... H04N 5/2251; G03B 17/56; G03B 17/561; G03B 17/566; G03B 17/568; F16G 11/14–11/146; F16B 2/08; F16M 13/022
See application file for complete search history.

(56) References Cited

U.S. PATENT DOCUMENTS

| | | | |
|---|---|---|---|
| 8,733,715 B2 | 5/2014 | Lee | |
| 9,554,639 B1* | 1/2017 | Harden | ..................... A45F 5/00 |
| 9,612,506 B1* | 4/2017 | Webb | ................... G03B 17/561 |
| 2010/0239241 A1* | 9/2010 | Chou | ............... G08B 13/19619 |
| | | | 396/427 |

(Continued)

OTHER PUBLICATIONS

"GoPro WaterSkiing & WakeBoarding Rope Mount", [Online]. Retrieved from the Internet: <URL: https://www.kickstarter.com/projects/zenxteninc/goprowaterskiingandwakeboardingropemount?ref=users>, (2014), 7 pgs.

(Continued)

*Primary Examiner* — Paul M Berardesca
(74) *Attorney, Agent, or Firm* — Schwegman Lundberg & Woessner, P.A.

(57) ABSTRACT

Devices and methods disclosed herein can include an accessory mount having a first clamp and a second clamp each configured to grip an elongate member. The first clamp and the second clamp can include an open configuration and a clamped configuration. In the open configuration, a respective first end is disengaged from a respective second end for receiving the elongate member. In the clamped configuration, the first end and the second end are moved to grip the elongate member. A first portion of the elongate bridge can be coupled to the first clamp and a second portion of the elongate bridge can be coupled to the second clamp. An accessory interface can be coupled to the elongate bridge. The accessory can be positionable along the elongate bridge for alignment along the longitudinal direction of the elongate member.

15 Claims, 7 Drawing Sheets

(56) References Cited

U.S. PATENT DOCUMENTS

| | | | |
|---|---|---|---|
| 2014/0252188 A1* | 9/2014 | Webster | F16M 13/022 |
| | | | 248/229.17 |
| 2015/0160537 A1* | 6/2015 | Bier | G03B 17/561 |
| | | | 248/219.4 |
| 2015/0226370 A1 | 8/2015 | Amussen | |
| 2015/0253650 A1* | 9/2015 | Huang | F16M 13/022 |
| | | | 348/376 |
| 2016/0334057 A1* | 11/2016 | Koch | F16B 47/006 |
| 2017/0067597 A1* | 3/2017 | Prugue | A42B 3/04 |
| 2017/0160625 A1* | 6/2017 | Bright | G03B 17/561 |

OTHER PUBLICATIONS

"GoPro WaterSports Mount (GoPro Rope Mount)", [online]. Retrieved from the Internet: <URL: https://www.kickstarter.com/projects/zenxteninc/goprowatersportsmountgoproropemount>, (2015), 8 pgs.

"How to Build a GoPro Water Ski Rope Mount", [Online]. Retrieved from the Internet: <URL: http://jeffandiane.blogspot.com/2012/07/howtobuildgoprowaterskiropemount.html>, (2012), 2 pgs.

"ZENXTENinc—Innovative Products for Everyday Riders", [online]. Retrieved from the Internet: <URL: http://www.zenxteninc.com/>, (2015), 3 pgs.

\* cited by examiner

ACCESSORY MOUNT

TECHNICAL FIELD

This document pertains generally, but not by way of limitation, to accessory mounts, such as action camera mounts.

BACKGROUND

Action cameras are often used by athletes or recreational users to record still images or video of activities for later viewing. Such devices are frequently used in outdoor environments. Accordingly, action cameras can be protected in environmentally sealed housings, making the action camera suitable for such uses.

Existing action cameras can be attached to the body of a wearer. For instance, the action camera can be coupled to a mount. Existing mounts can include straps that wrap around a wearer's hand, ankle, chest, or leg, and mounts that can strap to a wearer's shoe or footwear. In other examples, existing mounts can be attached to an article of sporting goods equipment, such as a helmet, selfie stick, bicycle, firearm, or the like. Some action camera mounts include an adapter for orienting the camera toward the user or in other orientations to capture views of scenery, the experience of the user, other individuals in view of the wearer, or the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
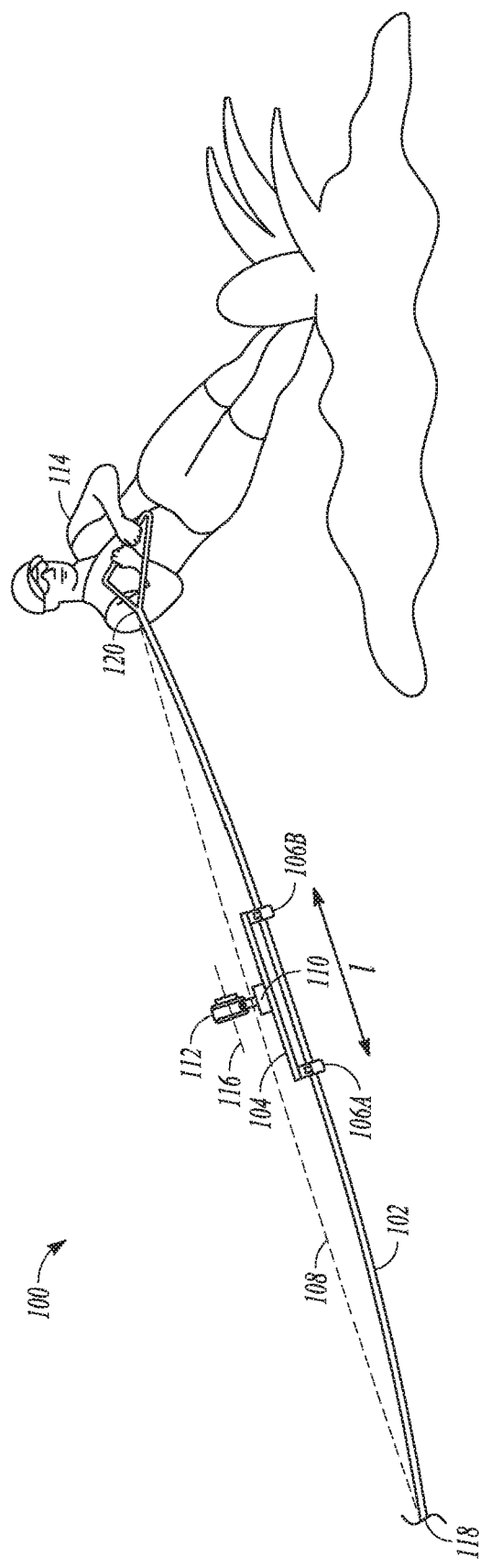
FIG. 1 illustrates a perspective view of an exemplary accessory mount coupled to a water sport tow rope, according to an embodiment.

The present application relates to devices and techniques for an accessory mount, such as an accessory or action camera mount for coupling to an elongate member (e.g., rope). The following detailed description and examples are illustrative of the subject matter disclosed herein; however, the subject matter disclosed is not limited to the following description and examples provided. Portions and features of some embodiments may be included in, or substituted for, those of other embodiments. Embodiments set forth in the claims encompass all available equivalents of those claims.

The present disclosure describes various devices for mounting an accessory, such as an action camera to a rope or other elongate member to align the accessory with respect to a longitudinal direction of the elongate member. For instance, in the example of a flexible elongate member it can be difficult to align the accessory along the longitudinal direction of the elongate member, especially if the elongate member is not taught, because a mass of the accessory can twist or bend the elongate member at the location where the accessory is coupled to the elongate member. Accordingly, a primary direction of the accessory can be misaligned with the longitudinal direction (or, e.g., a chord between a first end and a second end) of the elongate member.

In an example, an accessory mount can include a first clamp and a second clamp each configured to grip an elongate member. The first clamp and the second clamp can include an open configuration and a clamped configuration. For instance, in the open configuration, a respective first end of the first or second clamp is disengaged from a respective second end of the first or second clamp. Accordingly, the first and second clamp can be adapted for receiving the elongate member between the first end and the second end. In the clamped configuration, the first end and the second end can be adapted to grip the elongate member. An elongate bridge can include a first portion and a second portion. The first portion can be coupled to the first clamp and the second portion can be coupled to the second clamp.

In a further example, an accessory interface can be coupled to the elongate bridge of the accessory mount. The accessory interface can include mating features configured to couple an accessory (e.g., an action camera) to the elongate bridge. The accessory is positionable for alignment along the longitudinal direction of the elongate member. For instance, the elongate bridge and the accessory interface can adapted to align a primary direction the accessory along a longitudinal direction of the elongate member. As a result, the accessory mount can flex along with the elongate member to align the accessory, such as the axis of the accessory, along the longitudinal direction 108 of the elongate member 102. For instance, where the accessory is an action camera, the point of view of the action camera can be aligned with a subject at an end of the elongate member.

Figure 2A:
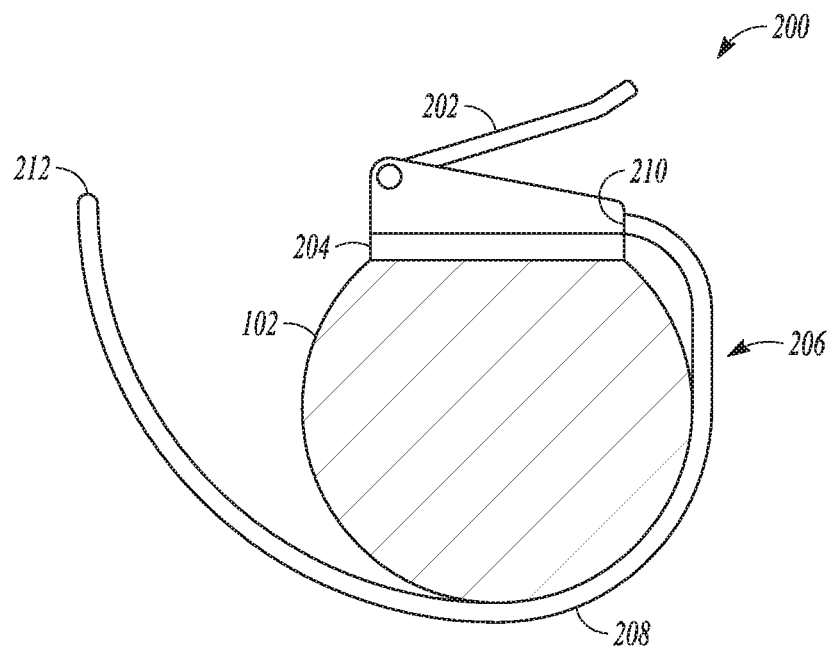
FIG. 2A is a cross section of an example of a clamp of an accessory mount in an open configuration around an elongate member, according to an embodiment.
Figure 2B:
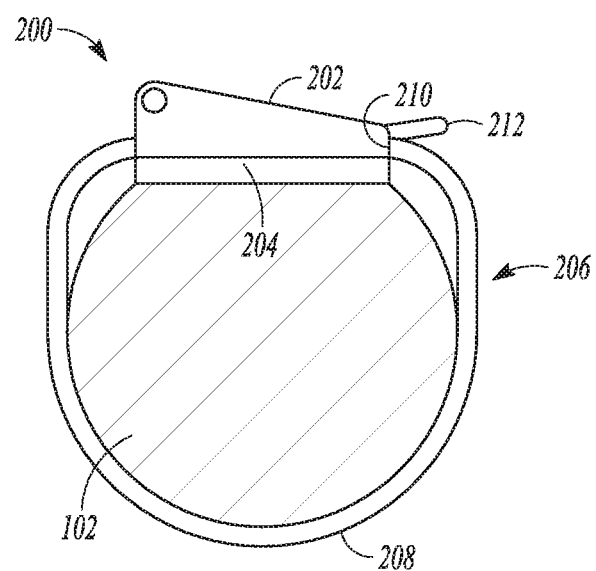
FIG. 2B is a cross section of an example of a clamp of an accessory mount in a closed configuration around an elongate member, according to an embodiment.
Figure 3A:
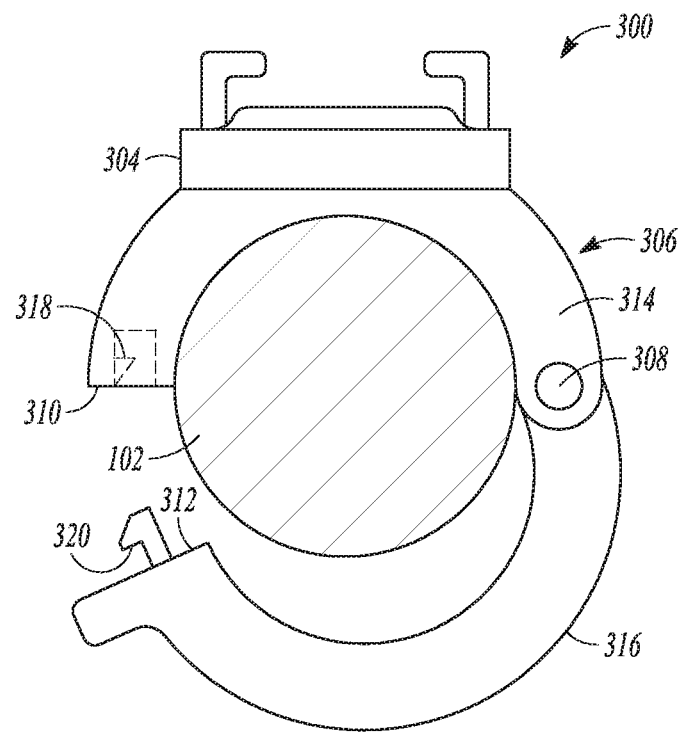
FIG. 3A is a cross section of a further example of a clamp of an accessory mount in an open configuration around an elongate member, according to an embodiment.
Figure 3B:
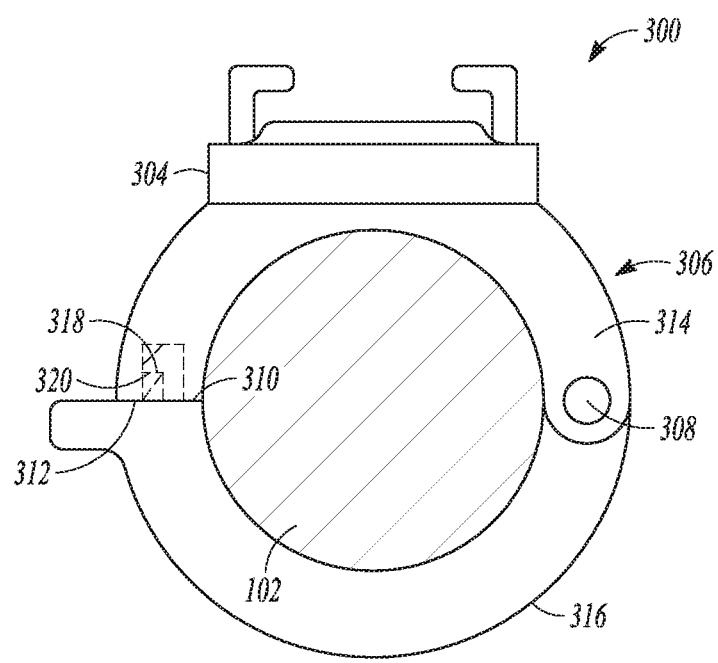
FIG. 3B is a cross section of a further example of a clamp of an accessory mount in a closed configuration around an elongate member, according to an embodiment.

FIG. 1 depicts an example of an accessory mount 100 attached to an elongate member 102 (e.g., a tow rope as shown in the example of FIG. 1). The accessory mount 100 can include an elongate bridge 104 having at least two clamps, such as a first clamp 106A and a second clamp 106B as shown in the example of FIG. 1. The first clamp 106A can be positionable along the elongate bridge 104 at a distance from the second clamp 106B. For instance, the first clamp 106A can be located between six-inches and thirty-six inches from the second clamp 106B along the elongate bridge 104. The clamps 106A and 106B are configured to grip the elongate member 102 and accordingly, attach the accessory mount 100 to the elongate member 102. The clamps 106A and 106B can include an open configuration and a closed configuration. In the open configuration, the clamps 106A and 106B can receive the elongate member 102 (as shown in FIGS. 2A and 3A and described further herein). In the closed configuration, the clamps 106A and 106B can be configured to grip the elongate member 102 (as shown in FIGS. 2B and 3B and described further herein). Accordingly, the accessory mount 100 can be coupled along any portion of the elongate member 102. For instance, the accessory mount 100 can be coupled to the middle of the elongate member 102 when a first end 118 or a second end 120 of the elongate member 102 are attached to another object. In a further example, the accessory mount 100 can be releasable from the elongate member 102 when the first end 118 or the second end 120 are attached to an object. In the example of FIG. 1, where the elongate member 102 is a tow rope for water sports, the accessory mount 100 can include buoyant materials or can include a float to provide buoyancy to the accessory mount 100 where the accessory mount 100 is released from the elongate member 102 in water.

Figure 6:
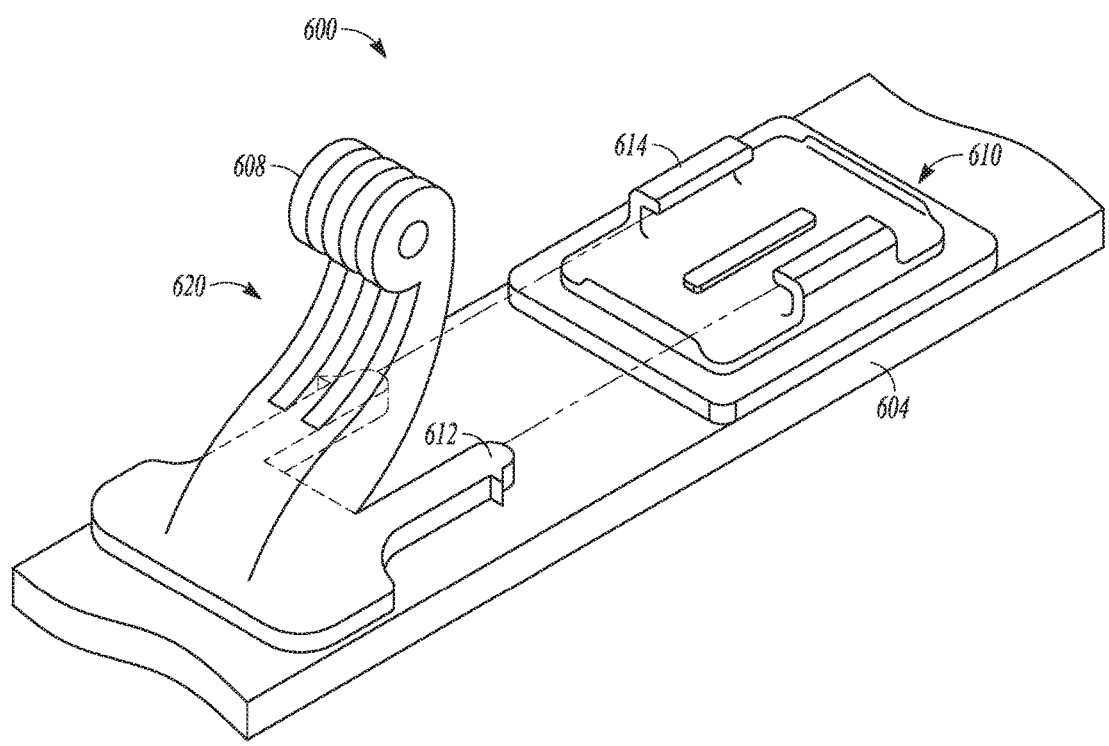
FIG. 6 is an example of an accessory interface, according to an embodiment.
Figure 7:
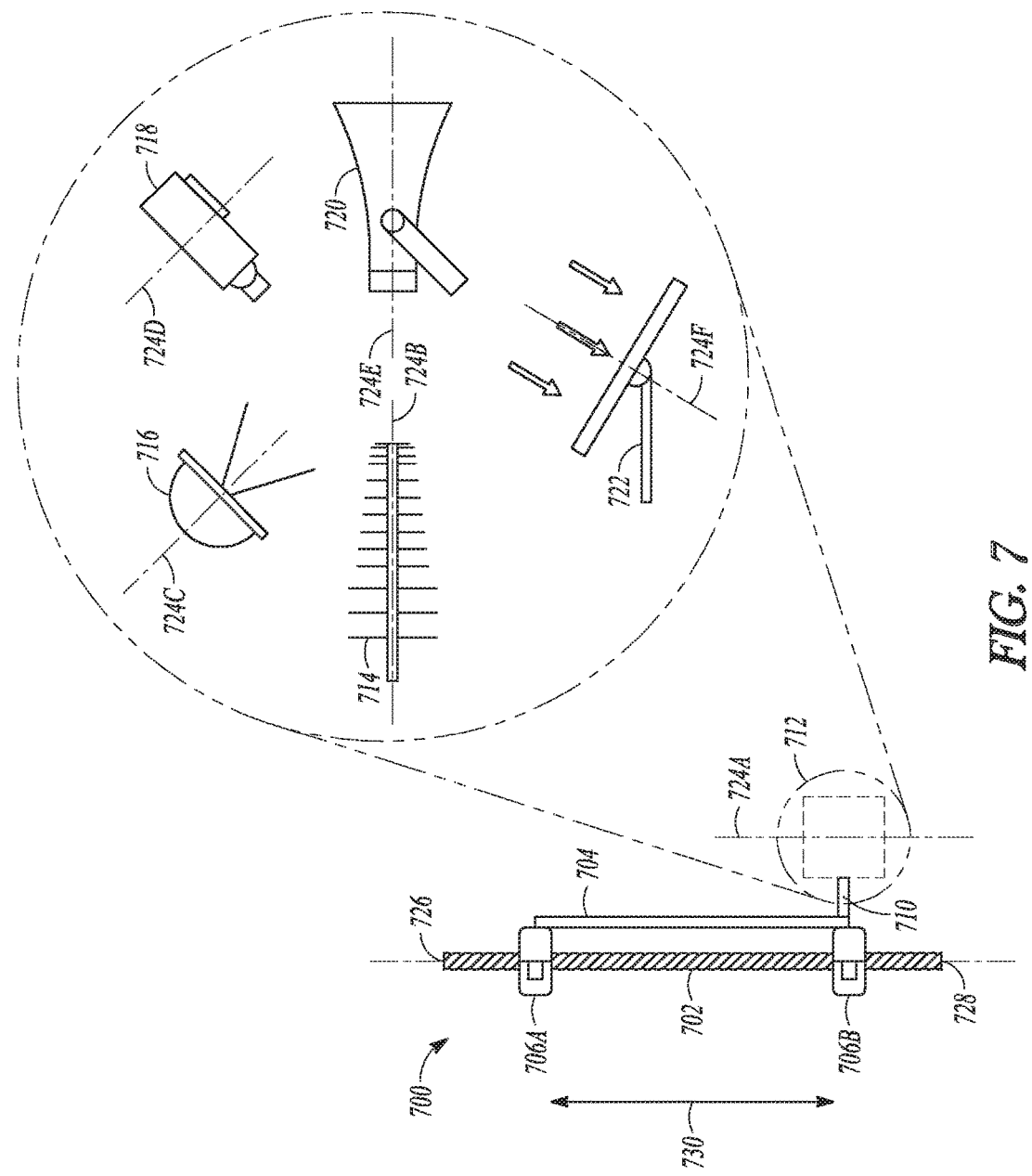
FIG. 7 is a block diagram of an example of an accessory mount including at least one of a variety of accessories, according to an embodiment.

An accessory interface 110 is adapted to couple an accessory 112 to the accessory mount 100, for instance, to couple the accessory 112 to the elongate bridge 104. The accessory interface 110 can include mating features configured to couple the accessory 112 to the elongate bridge 104 as shown in FIG. 6 and described further herein. In the example of FIG. 1, the accessory 112 can include an action camera. In further examples, the accessory 112 can include, but is not limited to, a light, speaker, antenna, or other accessory as shown in FIG. 7 and described further herein.

The elongate member 102 can include, but is not limited to, a rope, bar, chord, chain, flexible shaft, or the like. For instance, the elongate member 102 can include a water sports rope, such as a ski or wakeboarding line as shown in the example of FIG. 1. In further examples, the elongate member 102 can include a climbing rope, pole vault pole, or the like. In some examples, the elongate member 102 is flexible making alignment of the accessory 112 with the subject 114 difficult. For instance, the orientation of the elongate member 102, such as a longitudinal axis of the elongate member 102, may not be aligned with the subject 114 at a location where the accessory mount 100 is attached. In an example, the mass of the accessory 112 can misalign the accessory 112 with respect to the subject 114.

A length l of the elongate bridge 104 can increase the stability of the accessory 112. For instance, the elongate bridge 104 can align an axis of the accessory 116 with the longitudinal direction 108. In an example, the elongate bridge 104 can flex along with the elongate member 102, for instance, between the first clamp 106A and the second clamp 106B. Accordingly, the accessory mount 100 can flex along with the elongate member 102 to align the accessory 112, such as the axis of the accessory 116, along the longitudinal direction 108 of the elongate member 102. For instance, the longitudinal direction 108 of the elongate member 102 can include a longitudinal axis of the elongate member 102 or a path between a first end 118 and a second end 120 of the elongate member 102. In the example of FIG. 1, the axis of the accessory 116 can be an axis aligned along the center of a view finder of a camera, such as an action camera. The axis of the accessory 116 can be substantially aligned (e.g., within 5 degrees or 10 degrees of parallel) with the longitudinal direction 108 of the elongate member 102. In other examples, the accessory 112 can be aligned at an angle between 0 and 90 degrees with respect to the longitudinal direction 108 of the elongate member 102.

As shown in FIG. 1, the accessory mount 100 is positioned on an upper side of the elongate member 102. A torsional stiffness of the elongate member 102 can resist rotation of the accessory mount 100 about the longitudinal axis of the elongate member 102. In other examples, the accessory mount 100 can be positioned under the elongate member 102. For instance, a mass of the accessory mount 100 can hang below the elongate member 102. As a result of the mass, the accessory mount 100 can be positioned under the elongate member 102 as the elongate member 102 is rotated at one or more locations along the length of the elongate member 102.

FIG. 2A shows a cross section of an example of an accessory mount 200 including an elongate bridge 204 and a clamp 206, such as the first clamp 106A or the second clamp 106B of FIG. 1. The clamp 206 can include a clip 202 and at least one strap 208. In the example of FIG. 2A, the clamp 206 is in the open configuration. For instance, the clamp 206 can include a first end, such as a first end 210 of the strap 208 and a second end, such as the second end 212 of the strap 208. The first end 210 can be attached to the accessory mount 100, such as the elongate bridge 204. In the example of FIG. 2, the first end 210 is coupled to the clip 202. In the open configuration, the second end 212 can be disengaged from the first end 210. For instance, the first end 210 is coupled to the accessory mount 100 and the remainder of the strap 208 (from the first end 210 to the second end 212) is disengaged from the accessory mount 100.

In one example, the clamp 206 includes two straps 208, such as a first strap and a second strap. The first strap and the second strap can be coupled to the accessory mount 100, for instance, at a first and second respective attachment ends. The first strap can include a first end, opposite the respective attachment end, and the second strap can include a second end opposing the respective attachment end. In the open configuration, the first end can be disengaged from the second end to receive the elongate member 102 between the first strap and the second strap.

FIG. 2B depicts an example of the accessory mount 200 including the clamp 206 in the clamped configuration. For instance, in the example of FIG. 2B, the strap 208 can be arranged to loop around the elongate member 102. The first end 210 and the second end 212 of the strap 208 can be coupled to cinch the strap 208 around the elongate member 102 and accordingly grip the elongate member 102. In an example, the first end 210 and the second end 212 can be coupled to the elongate bridge 104. In another example, the strap 208 can be otherwise coupled to the accessory mount 100 and the first end 210 can be configured to couple to the second end 212 in order to grip the elongate member 102.

As shown in the example of FIGS. 2A and 2B, the clamp 206 can include a clip 202. The first end 210 can be fixably coupled to the clip 202 or the elongate bridge 204. For instance, the first end 210 can be sewn, glued, heat staked, riveted, or otherwise fastened to the clip 202, elongate bridge 104, or other portion of the accessory mount 200. The clip 202 can include, but is not limited to, a cam buckle, tri-glide, quick release buckle, snap buckle, belt buckle, or other type of clip configured to releasably secure the strap 208. For instance, the clip 202 of FIG. 2 is a cam buckle. In an example, the clip 202 can include a latched configuration and an unlatched configuration. In the unlatched configuration, the second end 212 can be inserted into the clip 202. When the clip 202 is in the latched configuration, the strap 208 can be held (e.g., secured or retained) within the clip 202. Accordingly, the first end 220 and the second end 212 can be coupled and arranged in a loop to grip the elongate member 102.

In some examples, the clip 202 can include a break-away feature. For instance, the clip 202 can move from the latched configuration to the unlatched configuration when tension on the strap 208 exceeds a threshold level. Accordingly, the break-away feature of the clip 202 can release the strap 208 and thus decouple the elongate member 102 from the clamp 206.

In an example, the clamp 206 can include the first strap and the second strap as previously described. In the clamped configuration, the first strap can be coupled to the second strap. For instance, the first strap end can be coupled to the second strap end. In an example, the first strap end can include a first latch interface and the second strap end can include a second latch interface configured to couple to the first latch interface. The first latch interface or the second latch interface can include, but is not limited to, a snap fit, snap buckle, hook and loop fastener, hook and loop buckle, zipper, or the like. For instance, the first latch interface can include a buckle, such as a belt buckle. The second latch interface can include a strap having at least one aperture for fastening to the first contact interface (e.g., belt buckle). In an example, the first strap end can include a tri-glide. The second end can be woven into the tri-glide to secure the strap 208 into a loop for griping the elongate member 102. Accordingly, the elongate member 102 can be clamped between the first end 210 and the second end 212.

In an example, the strap can include, but is not limited to, an elastic strap (e.g., butyl rubber, silicone rubber, or other elastomer), webbing (such as nylon webbing), a polymer strap (e.g., polyethylene or the like), fabric, or other strap. In the Example of FIGS. 2A and 2B, the strap 208 can include an elastic strap. The elastic strap can stretch around the elongate member 102 when the clamp 206 is in the clamped configuration. Accordingly, tension from the stretched strap 208 can increase the grip of the clamp 206 on the elongate member 102.

FIG. 3A illustrates an example of an accessory mount 300 including a clamp 306. The clamp 306 can include a first arm 314 coupled to a second arm 316 by a hinge 308. The first arm 314, second arm 316, or the hinge 308 can be coupled to the accessory mount 300, such as the elongate bridge 304. In the example of FIG. 3, the first arm 314 is coupled to the elongate bridge 304. The first arm 314, second arm 314, or hinge 308 can be constructed from a material including, but not limited to, a polymer or metal, such as polyamide, acrylonitrile butadiene styrene, polycarbonate, steel, aluminum, titanium, or the like. The first arm 314 can include the first end 310 and the second arm 316 can include the second end 312. In the open configuration, the first end 310 is disengaged from the second end 312 for receiving the elongate member 102 between the first end 310 and the second end 312. For instance, the first arm 314 can pivot away from the second arm 316 about the hinge 308 to permit the first arm 314 and the second arm 316 to at least partially surround the elongate member 102.

FIG. 3B is an example of the accessory mount 300 including the clamp 306 in the clamped configuration. In the clamped configuration, the first arm 314 and the second arm 316 can be moved to grip the elongate member 102. For instance, the first end 310 can be moved closer to the second end 312 to grip the elongate member. The elongate member 102 can be clamped between the first arm 314 and the second arm 316. Accordingly, the accessory mount 300 can be coupled to the elongate member 102.

In an example, the first end 310 can be coupled to the second end 312. For instance, the first end 310 can include a first latch interface and the second end can include a second latch interface as previously described. In the example of FIGS. 3A and 3B, the first and second latch interfaces include one or more snap-fits. For instance, the first arm 314 can include a retention feature 318 (e.g., undercut) and the second arm 316 can include a cantilevered beam having a hook geometry 320 at a distal end configured to engage the retention feature 318. When the first end 310 and the second end 312 are coupled together, the first arm 314 and the second arm 316 can clamp (e.g., grip) the elongate member 102 and couple the accessory mount 300 to the elongate member 102.

In some examples, the clamp 306 can include a break-away feature. For instance, the first end 310 can separate from the second end 312 where the elongate member 102 is pulled away from the accessory mount 300 by a force exceeding a threshold level. Accordingly, the break-away feature can release the clamp 306 and decouple the elongate member 102 from the clamp 206. As a result, the break-away feature can mitigate damage to the elongate member, such as cutting, tearing, or abrasion. Reducing damage to the elongate member 102 can be desirable for applications where a damaged elongate member 102 can present a safety hazard, such as attaching the accessory mount 100 to a rock climbing rope or the like.

In further examples, the clamp, such as the clamps 106A, 106B, 206, and 306, can be configured to grip rope, cord, pipe, tubing, pole, chain, wire, or other elongate members 102. The clamps can be adapted to mitigate damage to the elongate member 102. For instance, the clamps can include a material, such as an elastomer, or can include a pad to reduce abrasion to the elongate member 102. In further examples, the clamp 206 can include the pad to accommodate elongate members of various sizes. For instance, the pad can be compressible as the clamp 216 is moved from the open configuration to the closed configuration.

Figure 4:
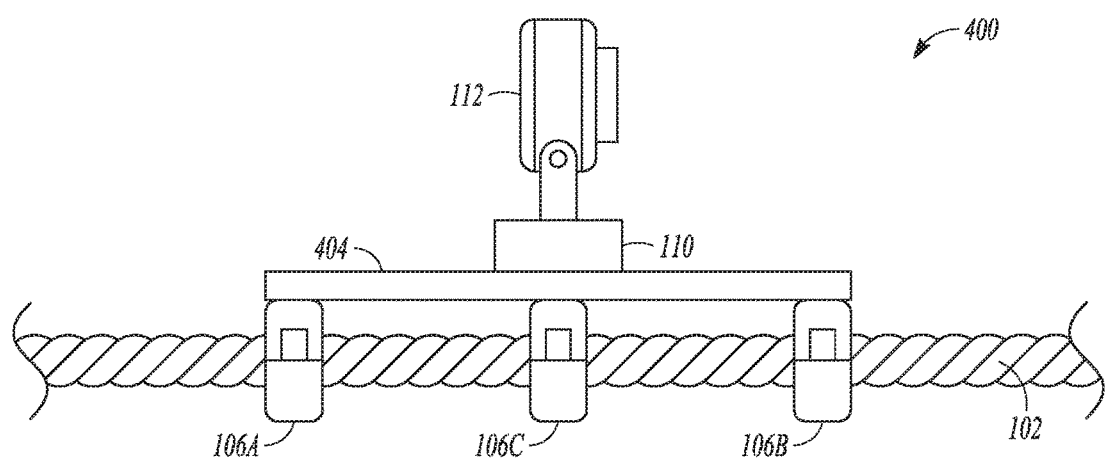
FIG. 4 is a side view of an example of an accessory mount including three clamps coupled along an elongate member, according to an embodiment.

FIG. 4 shows an example of an accessory mount 400 including three clamps, such as clamps 106A, 106B, and 106C. The clamps can include any combination of clamps, such as clamp 206, clamp 306, clamp previously described herein, or other clamp. For instance, the first clamp 106A can be coupled to a first portion of the elongate bridge 404, the second clamp 106B can be coupled to a second portion of the elongate bridge 404, and the third clamp 106C can be coupled to the elongate bridge 404 between the first clamp 106A and the second clamp 106B. In an example, additional clamps, such as the third clamp 106C can increase the grip of the combined clamps of the accessory mount 400 and accordingly increase the retention of the accessory mount 400 to the elongate member 102. In a further example, the additional clamp, such as the third clamp 106C can provide another attachment point for elongate bridge 404 to flex along with the elongate member 102. For instance, a shape of the elongate bridge 404 when flexed can more closely follow a curvature (e.g., shape) of the elongate member 102 along the length of the elongate bridge 404.

Figure 5:
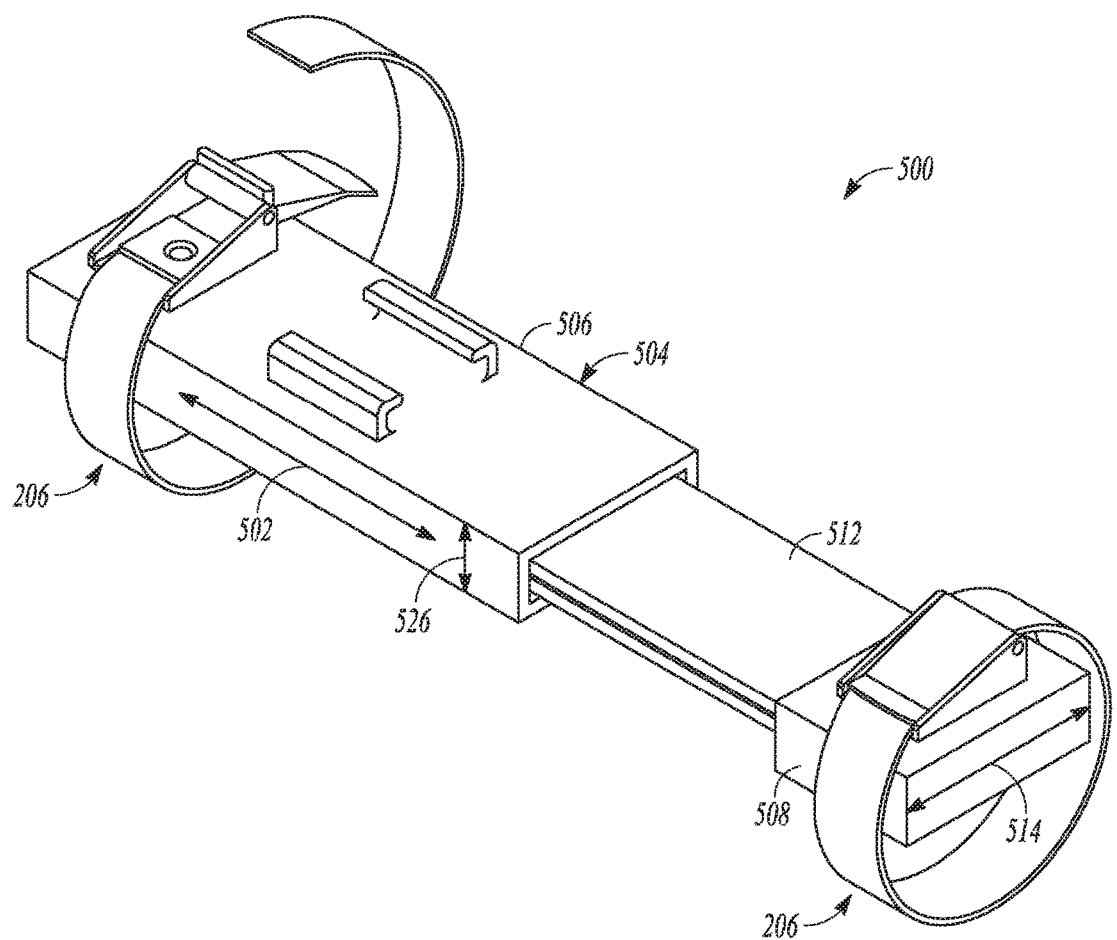
FIG. 5 depicts an example of an adjustable length bridge, according to an embodiment.

FIG. 5 depicts an example of an accessory mount 500 including an elongate bridge 504 that is adjustable in length. The accessory mount 500 can include an accessory interface 510 for coupling an accessory 112 to the elongate bridge 504. One or more clamps, can be coupled to the elongate bridge 504. For instance, the clamp 206 can be coupled to the first portion of the elongate bridge 504 and another clamp 206 can be coupled to the second portion of the elongate bridge 504. As shown in the example of FIG. 5, one clamp 206 is in the open configuration and the other clamp 206 is shown in the clamped configuration.

As previously discussed, the elongate bridge, such as the elongate bridge 104, 204, 304, 404, or 504 can be flexible. For instance, the elongate bridge 504 can include a width 514 that is greater than a thickness 526. Accordingly, the elongate bridge, such as elongate bridge 504 in the example of FIG. 5, can be more flexible in the direction of the thickness 526 than in the direction of the width 514. For instance, the elongate bridge 504 can include a width flexibility characteristic (e.g., a first flexibility characteristic) and a thickness flexibility characteristic (e.g., a second flexibility characteristic). The thickness flexibility characteristic can be less than the width flexibility characteristic. In an example, the elongate member 102 can include a flexibility characteristic (e.g., an elongate member flexibility characteristic). The flexibility of the elongate bridge 504, such as the first flexibility characteristic or the second flexibility characteristic can reduce the alteration of the elongate member flexibility characteristic as a result of coupling the accessory mount 500 to the elongate member 102. In an example, the elongate bridge 504 can be rigid. The elongate bridge, such as elongate bridge 504 can be constructed from a material including, but not limited to, a polymer, an elastomer, or a metal, such as aluminum. In further examples, the elongate bridge 504 can be constructed of a composite material.

The elongate bridge 504 can be extendable along a longitudinal direction 502. For instance, the elongate bridge 504 can include a first segment 506 and a second segment 508. The first segment 506 can be movably coupled to the second segment 508 by an extension 512. In the example of FIG. 5, the extension 512 can telescope within the first segment 506 to adjust the length of the elongate bridge 504. In further examples, the first segment 506 can include a plurality of selectively engageable connection points positioned lengthwise along the elongate bridge 504. The extension 512 or the second segment 508 can be selectively engaged to one or more of the selection points to increase or decrease the length of the elongate bridge 504.

FIG. 6 shows an example of an accessory mount 600 including an accessory interface 610. The accessory interface 610 can include accessory interface 110 for coupling an accessory 112, such as an action camera to the elongate bridge 604. The elongate bridge 604 can include the elongate bridge 104, 204, 304, 404, or 504. The accessory interface 610 can include, but is not limited to, a latch, guide, rail, snap, fastener, or the like. In the example, of FIG. 6, the accessory interface 610 can include a pair of retention members 614. In an example, the accessory interface 610 can include a universal accessory mount geometry, such as universal action camera mount geometry. For instance, the retention members 614 of the accessory interface 610 can include geometry used by one or more accessory producers. In an example, the accessory interface 610 or the retention members 614 can be interchangeable. For instance, the elongate bridge 604 can include features for coupling two or more accessory interfaces, such as accessory interface 610 to the elongate bridge 604, such as an accessory interface 610 for coupling the accessory 112 (e.g., a first accessory) and a second accessory interface for coupling a second accessory. The first and second accessory interfaces can be interchangeable for mounting either the first or the second accessories.

In an example, a stand-off 620 can be coupled between the accessory interface 610 and the accessory 112. The stand-off 620 can include an adapter 608 located at a distal end of the stand-off 620 for coupling the accessory 112 to the accessory interface 610. For instance, the adapter 608 can include, but is not limited to a thumb screw, bolt, snap fit, rivet, ball and socket joint, or other fastener. In an example the adapter 608 can be articulated. For example, the stand-off 620 can be adjustable to swivel or tilt the accessory 112 with respect to the elongate bridge 604. The example of FIG. 6 shows an articulated stand-off 620 having a plurality of interlocking hinge surfaces. A thumb screw can couple one or more interlocking hinge surfaces of the accessory 112 to the interlocking hinge surfaces of the stand-off 620. In another example, the stand-off 620 can include threaded boss and socket, for instance, a tripod connection per ISO 1222:2010, such as ¼-20 UNC or ⅜-16 UNC treaded connection. In an example, the stand-off 620 can position the accessory 112 at a distance from the elongate bridge 604 and accordingly, the elongate member 102. For instance, the stand-off 620 can include a length between four-inches and twelve-inches.

The stand-off 620 can include mating features 612 that are engagable with the accessory interface 610. The mating features 612 can latch on to the retention members 614 to couple the stand-off 620 to the accessory interface 610 and accordingly the elongate bridge 604. In an example, the stand-off 620 and the elongate bridge 604 can be constructed as a single component or part. In other words, the stand-off 620 can be integral with the elongate bridge 604. For example, the stand-off 620 and elongate bridge 604 can be molded as a single component. In a further example, the accessory interface 610 can be integral with the elongate bridge 604.

FIG. 7 is a block diagram depicting an example of an accessory mount 700. The accessory mount 700 can include an elongate bridge 704, such as the elongate bridge 104, 204, 304, 404, 504, or 604 as previously described herein. A first clamp 706A and a second clamp 706B, such as the clamp 106A-C, 206, 306, 506, or 604. The first clamp 706A can be coupled to a first portion of the elongate bridge 704, and the second clamp 706B can be coupled to a second portion of the elongate bridge 704. An accessory interface 710, such as the accessory interface 110, 510, or 610, can couple an accessory 712 to the elongate bridge 704.

As previously described with regard to the accessory mount 100, the accessory mount 700 can flex along with the elongate member 702 to align an accessory 712 (e.g., accessory 112), the accessory interface 710, or an axis 724A-F of the accessory 712 along the longitudinal direction 730 of the elongate member 702. For instance, the longitudinal direction 730 of the elongate member 702 can include a longitudinal axis of the elongate member 702 or a path between a first end 726 and a second end 728 of the elongate member 702. In an example, the longitudinal direction 730 can include a chord between first clamp 706A and second clamp 706B. In the example of FIG. 7, the elongate member 702 can be aligned in an upright orientation, such as vertically. For instance, the elongate member 702 can be suspended from a structure, tree, or other object. Accordingly, the longitudinal direction 730 can include a vertical or substantially vertical direction (e.g., 10 degrees or less of vertical).

The accessory 712 can include, but is not limited to, an antenna 714 (e.g., an antenna with enhanced directionality), a light 716, a camera 718 (e.g., an action camera), a loud speaker 720, a solar panel 722, or other accessory having an output that includes a directionality characteristic. The accessories 712 can include an axis 724A-F respectively along a primary axis of directionality of the accessory, such as accessories 714-722. In one example, the axis of the accessory (e.g., axis 724A-F) can be aligned at an angle between 0 and 90 degrees from the longitudinal direction 730. Accordingly, the accessory 712 can be aligned with respect to the longitudinal direction 730, and the elongate bridge 704 can maintain alignment with the longitudinal direction 730 (e.g., tangent to the elongate member 702 or along a chord between the first clamp 706A and the second clamp 706B) when the elongate member 702 flexes.

In an example, a tether can be coupled between the accessory 712 and an anchor point. The tether can include a rope, cable, spar, or the like. For instance, the tether can hold the orientation of the accessory 712 with respect to the elongate member 102. The accessory 712 can be rotated or translated about the accessory interface 610 (e.g., about the adapter 608) by the tether. In an example, the accessory 712, such as the antenna 714, can be positioned at any orientation around the elongate member 102 (e.g., from 0-360°) by guiding the antenna 714 from a first orientation to a second orientation by moving the tether. Accordingly, the directionality of the antenna 714 can be adjusted by a user applying force, such as tension, to the tether and orienting the antenna 714 toward a target direction. In a further example, the tether can be used to translate the accessory mount 100 toward a lateral direction or the longitudinal direction of the elongate member 102. For instance, the accessory mount 100 and the elongate member 102 can be translated in the lateral or longitudinal direction of the elongate member 102.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The above description is intended to be illustrative, and not restrictive. For example, the above-described examples (or one or more aspects thereof) may be used in combination with each other. Other embodiments can be used, such as by one of ordinary skill in the art upon reviewing the above description.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An accessory mount, comprising:
a first clamp and a second clamp each configured to grip an elongate member, wherein the first clamp and the second clamp include an open configuration and a clamped configuration including:
in the open configuration, a respective first end is disengaged from a respective second end for receiving the elongate member between the respective first end and the respective second end, and
in the clamped configuration, the respective first end and the respective second end are moved to grip the elongate member;
an elongate bridge including a first portion and a second portion, wherein the first portion is coupled to the first clamp and the second portion is coupled to the second clamp; and
an accessory interface coupled to the elongate bridge, wherein the accessory interface includes mating features configured to couple an accessory to the elongate bridge, and wherein the accessory is positionable along the elongate bridge for alignment along a longitudinal direction of the elongate member;
wherein the elongate bridge includes a first flexibility characteristic along a first direction and a second flexibility characteristic along a second direction; and
wherein the first flexibility characteristic is different than the second flexibility characteristic to flex the elongate bridge along with the elongate member to maintain alignment of the accessory along the longitudinal direction of the elongate member as the elongate member moves.

2. The accessory mount of claim 1, wherein the elongate member is a rope.

3. The accessory mount of claim 1, wherein the elongate bridge has an adjustable length.

4. The accessory mount of claim 1, wherein the accessory interface includes a stand-off having a length between four-inches and twelve-inches, the stand-off adapted to separate the accessory from the elongate member by at least the length of the stand-off.

5. The accessory mount of claim 1, wherein the accessory interface is configured to fasten an action camera to the elongate bridge.

6. The accessory mount of claim 1, wherein the first and second clamps are elastic straps.

7. The accessory mount of claim 1, wherein the first and second clamps include a break-away feature.

8. The accessory mount of claim 1, wherein the first clamp is positionable along the elongate bridge between six-inches and thirty-six inches from the second clamp.

9. The accessory mount of claim 1, wherein the accessory is one of: an antenna, a light, a camera, a loud speaker, or a solar panel.

10. An action camera mount, comprising:
a first strap and a second strap each configured to grip a rope, wherein the first strap and the second strap include an open configuration and a clamped configuration including:
in the open configuration, a respective first end is disengaged from a respective second end, and
in the clamped configuration, the respective first end and the respective second end are coupled and arranged in a loop to grip the rope;
an elongate bridge including a first portion and a second portion, wherein the first portion is coupled to the first strap and the second portion is coupled to the second strap; and
an accessory interface coupled to the elongate bridge, wherein the accessory interface includes mating features configured to fasten an action camera to the elongate bridge, and wherein the action camera is positionable with respect to the elongate bridge for alignment along a longitudinal direction of the rope;
wherein the elongate bridge includes a first flexibility characteristic along a first direction and a second flexibility characteristic along a second direction; and wherein the first flexibility characteristic is different than the second flexibility characteristic to flex the elongate bridge along with the rope to maintain alignment of the action camera along the longitudinal direction of the rope as the rope moves.

11. The action camera mount of claim 10, wherein the elongate bridge has an adjustable length.

12. The action camera mount of claim 10, wherein the accessory interface includes a stand-off having a length between four-inches and twelve-inches, the stand-off adapted to separate the action camera from the rope by at least the length of the stand-off.

13. The action camera mount of claim 10, wherein the first and second straps are elastic straps.

14. The action camera mount of claim 10, wherein the first and second straps include a break-away feature.

15. The action camera mount of claim 10, wherein the first strap is positionable along the elongate bridge between six-inches and thirty-six inches from the second strap.

* * * * *